Patented July 23, 1929.

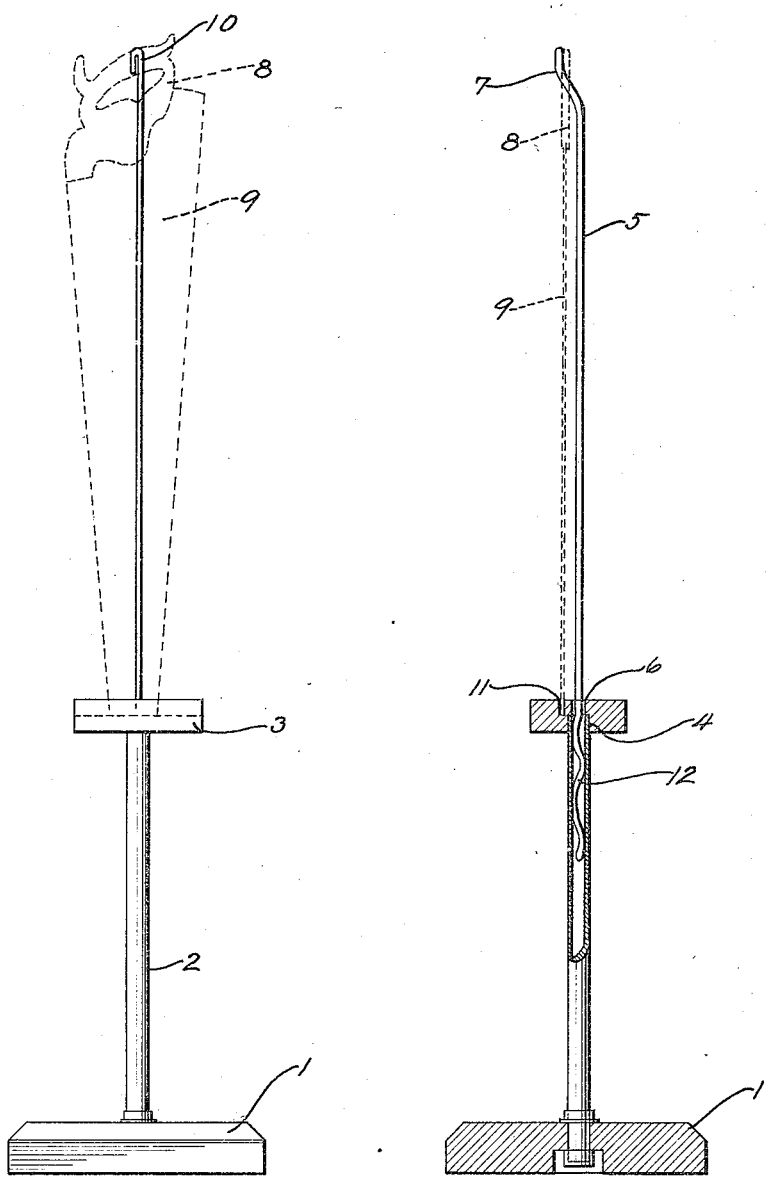

1,722,021

UNITED STATES PATENT OFFICE.

WILLIAM S. STEEL AND PERRY C. FRY, OF OAKLAND, CALIFORNIA.

DISPLAY STAND.

Application filed May 10, 1926. Serial No. 107,938.

Our invention relates to improvements in display stands, and it consists in the combinations, constructions and arrangements hereinafter described and claimed.

An object of our invention is to provide a display stand which is extremely simple in construction, and which is particularly designed for displaying saws. The saw displaying and supporting member is constructed of a single piece of wire, this wire being bent in a particular shape whereby it is readily adapted to be removably secured in place.

Other objects and adavantages will appear in the following specification, and the novel features of our invention will be particularly pointed out in the appended claim.

Our invention is illustrated in the accompanying drawing, forming a part of this application, in which—

Figure 1 is a side elevation of the device, and

Figure 2 is a view taken at right angles to that shown in Figure 1, a portion of the device being shown in section.

In carrying out our invention we make use of a stand or base 1. This base carries an upright 2, circular in cross section. At the top of the circular member 2 we dispose a saw rest 3. The rest 3 is provided with a bore 4 into which the tube 2 is forced.

A saw supporting member 5 consisting of a wire, is inserted through the reduced portion 6 of the opening 4, and is partially received in the tube 2, see Figure 2. That part of the wire 5 that is received in the tube 2 is bent in the manner shown in Figure 2 for causing the wire to frictionally engage with the inner wall of the tube, whereby the wire is firmly secured in place without the need of any additional fastening means. The portion of the wire 5 projecting above the rest 3 may be straight if desired, except for the upper end of the wire which is bent in the manner shown in Figure 2. The wire 5 is curved at 7 for receiving the handle 8 of a saw 9, and has its upper end bent at 10 for preventing the cut end of the wire from being exposed.

From the foregoing description of the various parts of the device, the operation thereof may be readily understood. In Figures 1 and 2 we show how the saw 9 is disposed in place. The saw supporting member 5 is first adjusted so as to dispose the portion 7 adjacent to the handle 8 when the end of the saw rests in a cut 11 in the upper surface of the rest 3. It will clearly be seen from the drawing that the bent portion 12 of the wire 5 will hold the wire 5 in any adjusted position desired.

In disposing the saw 9 in place, the handle 8 is dropped over the curved portion 7 and then the end of the saw is placed in the cut or slot 11. The wire 5 may be removed from the tube 2 so as to permit the device to be packed in a small space for shipment.

We claim:

A display stand comprising a base, a tubular member carried by said base; a saw rest carried by the tubular member, a saw supporting member extending into the tubular member; the end of the supporting member having a plurality of bow-shaped bends for frictionally engaging the inside periphery of the tubular member; said saw rest having a slot therein for receiving the end of a saw blade; the free end of the supporting member being bent and rebent, the rebent portion of said supporting member extending upwardly in alignment with the slot for suspending the saw so as to allow the holding of the end of the saw in said slot.

In testimony whereof we affix our signatures.

WILLIAM S. STEEL.
PERRY C. FRY.